United States Patent [19]
Bunick et al.

[11] Patent Number: 5,094,862
[45] Date of Patent: Mar. 10, 1992

[54] SALT SUBSTITUTE GRANULE AND METHOD OF MAKING SAME

[75] Inventors: Frank J. Bunick, Parsippany; Shiuh J. Luo, Livingston; James J. Shaw, Morristown; Stephen R. Hellman, Mount Tabor, all of N.J.

[73] Assignee: Warner-Lambert Company, Morris Plains, N.J.

[21] Appl. No.: 398,800

[22] Filed: Aug. 25, 1989

[51] Int. Cl.$^5$ .......... A23L 1/09; A23L 1/237
[52] U.S. Cl. .......... 426/96; 426/538; 426/649; 426/658
[58] Field of Search .......... 426/649, 538, 961, 658

[56] References Cited

U.S. PATENT DOCUMENTS

| | | | |
|---|---|---|---|
| 2,421,185 | 5/1947 | Comstock | 426/649 |
| 3,039,880 | 6/1962 | Kawamura | 426/97 |
| 3,197,277 | 7/1965 | Cooke | 426/649 |
| 3,262,788 | 7/1966 | Swanson et al. | 426/285 |
| 4,544,565 | 10/1985 | Barnett | 426/538 |
| 4,556,566 | 12/1985 | Bell | 426/96 |
| 4,556,567 | 12/1985 | Meyer | 426/96 |
| 4,556,568 | 12/1985 | Meyer | 426/96 |
| 4,567,053 | 1/1986 | Lindley | 426/538 |
| 4,642,240 | 2/1987 | Barnett et al. | 426/538 |
| 4,755,397 | 7/1988 | Eden et al. | 426/650 |
| 4,910,031 | 3/1990 | Budd et al. | 426/808 |

FOREIGN PATENT DOCUMENTS 2157148 10/1985 United Kingdom .
2180534 1/1987 United Kingdom .

OTHER PUBLICATIONS

"Insta-Salt, Insta-Sweet Highlight IFP's Agglomeration", *Prepared Foods*, p. 168, Aug. 1986.

Primary Examiner—Donald E. Czaja
Assistant Examiner—Mary S. Mims
Attorney, Agent, or Firm—Craig M. Bell

[57] ABSTRACT

A free-flowing salt substitute granule which comprises a core composition comprising a nonsweet carbohydrate and a coating on the core comprising sodium chloride.

25 Claims, No Drawings

SALT SUBSTITUTE GRANULE AND METHOD OF MAKING SAME

BACKGROUND OF THE INVENTION

1. Field of the Invention

This invention relates to a free-flowing salt substitute granule, and method of using and producing the same, and more particularly to a salt substitute granule prepared from a nonsweet carbohydrate and sodium chloride. A particularly preferred aspect of the invention employs sugar and a sweetness inhibitor to prepare a bulking agent used to make a salt substitute granule simulating natural salt.

2. Description of the Related Art

The use of salt as a taste and flavor enhancing agent is well known. In food processing, the preservative and organoleptic qualities of salt are well established, and it is fully recognized that salt, even when used in excess, is attractive to the consumer. The total daily intake of salt in North America is estimated to be in the range of 10 to 12 grams of salt. Highly salted snack foods account for a significant consumption of salt, which consumption has increased markedly in many parts of the world.

While table salt which contains sodium and chloride ions is normally not retained in the body even when there is excess indulgence, table salt use has been attributed to hypertension which affects more than 20% of the world population. Even though a definitive correlation between salt intake and hypertension has not been fully determined, the medical community remains concerned over the extent of salt intake abuse and advocate salt intake reduction. As a result, the consuming public has become fully aware of the pressures being put on them to curtail salt use.

This curtailment has led to the development of a number of salt substitute compositions which are available containing various replacements, such as potassium chloride with and without added sodium chloride. U.S. Pat. Nos. 4,556,566; 4,556,567; and 4,556,568 teach compositions containing potassium chloride as a salt substitute wherein the potassium chloride comprises the core of the particle which is then coated with a maltodextrin ('567), a coating mixture of maltodextrin and sodium chloride ('566), and a coating mixture of maltodextrin, sodium chloride and cream of tartar (potassium bitartrate) ('568). Such potassium salt substitutes however, have been found to be unacceptable since they exhibit a bitter organoleptic taste when used and thus have not been fully effective at replacing sodium chloride.

The use of sweet and nonsweet carbohydrate bulking agents in the preparation of savory flavored products that may contain optimal additions including salt products is disclosed in two copending applications of the present assignee. These applications are U.S. Ser. No. 222,479 filed on July 21, 1988 and entitled "Savory Flavored Nonsweet Compositions Using Sweet Carbohydrate Bulking Agent" and U.S. Ser. No. 222,599 filed on July 21, 1988 and entitled "Savory Flavored Nonsweet Compositions Using Nonsweet Carbohydrate Bulking Agent". The inventions described in the applications relate to savory flavored products and not to salt substitute granules which are designed to replace pure natural table salt.

Accordingly, there remains a need for a sodium chloride product which permits a consumer to reduce their salt intake without changing the manner of applying salt and which has granules which taste as salty as table salt yet, contain less sodium content. Such a product should not change the organoleptic properties expected from salt, nor its manner of use, such as shaking, dipping or licking and so forth.

SUMMARY OF THE INVENTION

Applicants have unexpectedly discovered a free-flowing salt substitute granule which comprises: (a) a core composition comprising a nonsweet carbohydrate bulking agent; and (b) a coating on the core comprising sodium chloride. The term coating as used herein refers to a material which is fused, agglomerated, or spray coated on the bulking agent. The nonsweet carbohydrate bulking agent may be selected from the group consisting of nonsweet or low sweet hydrogenated starch hydrolysates, polymers of glucose, and other carbohydrates such as gum arabic, and other hydrocolloid gums, and mixtures thereof. In addition, the nonsweet carbohydrate bulking agent may be composed of a sweet carbohydrate bulking agent and a sweetness inhibiting agent to nullify the sweetness of the bulking agent. Particularly preferred sweetener inhibitors are 2-p-methoxyphenoxypropionic acid, p-methoxy-benzylacetic acid, and mixtures thereof.

A particularly preferred feature of the invention involves a use of sucrose with a sweetener inhibitor as the bulking agent which prepares a salt substitute granule simulating natural salt. The use of such bulking agents enables a reduction in salt content from 25 to 75% in the final granule which granule still retains its salt like properties, texture, shakeability, ability to cling to food, organoleptic taste and flavor enhancement capability.

The free-flowing salt substitute granules of the present invention may be preferably prepared by a) forming a core particle comprising a particulate non-sweet carbohydrate bulking agent having a particle size of less than about 60 mesh, U.S. standard sieve size; (b) admixing a powdered sodium chloride therewith to form a coated core; and (c) recovering a free-flowing salt substitute granule.

In an alternate procedure, the granules are prepared by (a) forming a core particle comprising a particulate nonsweet carbohydrate bulking agent having a particle size of less than about 60 mesh, U.S. standard sieve size; (b) spray coating the core particles with an aqueous solution of sodium chloride to coat the core particles; (c) drying the salt coated particles and recovering a free-flowing salt substitute granule.

DESCRIPTION OF THE PREFERRED EMBODIMENTS

Applicants have unexpectedly discovered that compositions which taste like salt and which are delivered like salt may be prepared from nonsweet carbohydrate bulking agents and sodium chloride itself. The compositions of the present invention are different from natural salt in that they contain from about 25% to about 75% less salt per equivalent granule size and yet they have the same organoleptic properties and physical properties of natural salt. This invention utilizes a nonsweet carbohydrate as a bulk replacer for the salt normally present in the granule and avoids the use of bitter salt substitutes such as potassium chloride. By employing such nonsweet bulking agents the organoleptic properties of the salt are not modified yet the salt tastes, feels and acts like real salt when used with edible products. While the exact reason for this result is not known, it is believed to be attributable to the salt's surface area. That is, by employing salt particles having an increased surface area which are then made into the salt granules having equivalent overall surface area to natural salt, it has been found that the resulting product has the same properties as natural salt, yet markedly reduces the total salt present in the product. This effect is completely unexpected.

The nonsweet carbohydrate bulking agents of the present invention must have a physical make-up to provide adequate bulk and texture to the composition. In addition, the carbohydrate bulking agents must contribute no sweetness or minimal sweetness to the composition. The sweet carbohydrate bulking agents of the present invention must have a physical make-up to provide adequate bulk and texture to the composition. Suitable sweet carbohydrate bulking agents include sugars, sugar alcohols, hydrogenated hexoses and pentoses, hydrogenated disaccharides, sweet hydrogenated starch hydrolysates and mixtures thereof.

Suitable sugar bulking agents include monosaccharides, disaccharides and polysaccharides such as sucrose, glucose, xylose, ribose, mannose, galactose, fructose, dextrose, maltose, invert sugar, partially hydrolyzed starch and corn syrup solids, and mixtures thereof, with sugar being the preferred sweet bulking agent. The weight ratio of sucrose to corn syrup solids is generally from about 0.5:1 to about 2:1, preferably from about 1:1 to about 2:1, and most preferably from about 1.3:1 to about 1.7:1.

Suitable sugar alcohol bulking agents include sorbitol, xylitol, mannitol, galactitol, maltitol, and mixtures thereof.

Suitable hydrogenated disaccharides include hydrogenated isomaltulose manufactured under the tradename PALATINIT by Palatinit Subungsmittel GMBH and hydrogenated lactose manufactured under the trademark LACTITOL by C.C.A. Biochem b.v. LACTITOL contains about half the calories of other sugar alcohols.

The hydrogenated starch hydrolysates employed herein may include those disclosed in reissue U.S. Pat. Nos. Re. 25,959, 3,356,811, 4,279,931 and various hydrogenated glucose syrups and/or powders which contain sorbitol, hydrogenated disaccharides, hydrogenated higher polysaccharides, or mixtures thereof.

Hydrogenated starch hydrolysates are primarily prepared by the controlled catalytic hydrogenation of corn syrups. The resulting hydrogenated starch hydrolysates are mixtures of monomeric, dimeric, oligomeric, and polymeric saccharides. The ratios of these different saccharides give different hydrogenated starch hydrolysates different properties. The degree of polymerization (DP) of various hydrogenated starch hydrolysates is presented in Table 1.

Products high in percentages of monomer (DP1) and dimer (DP2) will have higher sweetness levels and produce softer confectionery products. Products high in percentages of polymers will have low sweetness and produce confectionery products that have a hard texture. DP-1, for example could stand for sorbitol, mannitol, xylitol or any other hydrogenated monosaccharide. DP-1 is generally sorbitol due to the natural abundance of glucose in syrup starting material. Similarly, the percent DP-2 defines the amount of hydrogenated disaccharides such as maltitol present while DP-3, DP-4, DP-5 . . . and so on define the amounts of higher hydrogenated saccharides present in the hydrogenated starch hydrolysate.

Preferably the hydrogenated starch hydrolysates used in the present invention will have a DP-1 value from about 5% to about 10%, a DP-2 value from about 15% to about 65%, and a DP-3 and DP-4 value from about 30% to about 70%.

Suitable sweetness inhibiting agents include those compounds disclosed in United Kingdom Patent Application 2,157,148, and U.S. Pat. No. 4,567,053, both of which are incorporated herein by reference. The preferred sweetness inhibiting agents disclosed comprise two related series of compounds which are ethers or thioethers of acetic acid derivatives. The sweetness inhibiting compounds have the general formula:

A—(O)m—C(B)(E)—COOX where m represents 0 or 1; A represents a homocyclic or heterocyclic aromatic group; B represents hydrogen, a 1-3 carbon aliphatic group or phenyl; or, when m represents 0, A and B complete a homocyclic or heterocyclic aromatic group, or a methylene group substituted by a homocyclic or heterocyclic aromatic group; E repersents hydrogen or alkyl or; when m represents O, hydroxy or alkoxy; D represents oxygen or sulfur; X represents hydrogen or a physiologically compatible cation, with the provision that m represents 1 when A represents phenyl and B and C both represent hydrogen; or when A represents unsubstituted phenyl, B represents alkyl and C represents hydrogen.

Other suitable sweetness inhibiting agents include the salts of substituted benzoylalkyl carboxylic acids disclosed in U.S. Pat. No. 4,544,565, which patent is incorporated hereby by reference. These sweetness inhibiting agents have the general formula:

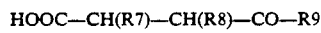

HOOC—CH(R7)—CH(R8)—CO—R9 where R7 is hydrogen or C-C3 alkyl, R8 is hydrogen or C1-C3 alkyl, and R9 represents a pentasubstituted phenyl group the substituents of which are independently selected from the group consisting of hydrogen, C1-C3 alkyl, C1-C3 alkoxy, C1-C2 hydroxyalkyl, hydroxy and carboxy.

Other suitable sweetness inhibiting agents include 3-aminobenzenesulfonic acid and derivatives thereof disclosed in U.S. Pat. No. 4,642,240, which patent is incorporated hereby by reference.

Other suitable sweetness inhibiting agents include the substituted phenylalkyl carboxylic acid salts and substituted phenyl ketoalkyl carboxylic acid salts disclosed in U.S. Pat. No. 4,567,053, which patent is incorporated hereby by reference. These sweetness inhibiting agents have the general formula:

XOOC—(CO)$_m$(CH$_2$)$_n$—C$_6$H$_4$—(R)$_p$— where m represents 0 or 1, and when m represents 0, n represents 1, 2 or 3 and p represents 1, 2, 3, or 4, and when m represents 1, n represents 1 or 2 and p represents 0, 1, 2, 3 or 4; the substituents R individually represent a lower alkoxy group, phenoxy group or a lower alkyl or trifluoromethyl group; two substituents R together represent an aliphatic chainlinked to the phenyl ring at two positions, or one substituent R representa a hydroxy group while at least one other substituent R represents a alkoxy group and X is a physiologically acceptable cation.

Other suitable sweetness inhibiting agents include the substituted benzoyloxy acetic and 2-propionic acid salt derivatives disclosed in United Kingdom Patent Application 2,180,534, which application is incorporated herein by reference. These sweetness inhibiting agents have the general formula:

R1—C6H4—COO—CR2R3—COOH where R1 is hydroxy or alkoxy containing 1 to 4 carbons, and R1 and an adjacent R2 together form a methylenedioxy ring; each R2 individually is selected from the group consisting of hydrogen, alkyl containing 1 to 3 carbons, alkoxy containing up to 2 carbons, hydroxy and carboxymethoxy group with the provision that when R2 individually is a functional group of alkyl, alkoxy, hydroxy or carboxymethoxy, the number of functional groups will not exceed two; and R3 is hydrogen or methyl.

Preferred sweetness inhibiting agents are 2-p-methoxyphenoxypropionic acid manufactured under the trademark LACTISOLE by Tate & Lyle and p-methoxybenzylacetic acid and mixtures thereof.

In addition to the sweet carbohydrate, nonsweet carbohydrates may be employed.

Suitable nonsweet carbohydrate bulking agents include nonsweet or low sweet hydrogenated starch hydrolysates, polymers of glucose, and other carbohydrates such as gum arabic, and other hydrocolloid gums, and mixtures thereof.

Hydrogenated starch hydrolysates are primarily prepared by the controlled catalytic hydrogenation of corn syrups. The resulting hydrogenated starch hydrolysates are mixtures of monomeric, dimeric, oligomeric, and polymeric saccharides. The ratios of these different saccharides give different hydrogenated starch hydrolysates different properties. The degree of polymerization (DP) of various hydrogenated starch hydrolysates is presented in Table 1

Products high in percentages of monomer (DP1) and dimer (DP2) will have higher sweetness levels and produce softer confectionery products. Products high in percentages of polymers will have low sweetness and produce confectionery products that have a hard texture. DP-1, for example could stand for sorbitol, mannitol, xylitol or any other hydrogenated monosaccharide. DP-1 is generally sorbitol due to the natural abundance of glucose in the corn syrup starting material. Similarly, the percent DP-2 defines the amount of hydrogenated disaccharides such as maltitol present while DP-3, DP-4, DP-5 ... and so on define the amounts of higher hydrogenated saccharides present in the hydrogenated starch hydrolysate.

Preferably the hydrogenated starch hydrolysates used in the present invention will have a DP-1 value from about 5% to about 20%, a DP-2 value from about 5% to about 15% and a DP-3 and DP-4 value of up to about 90%. Most preferably, the hydrogenated starch hydrolysate will have a DP-1 value from about 10% to about 15%, a DP-2 value from about 5% to about 10%, and a DP-3 and DP-4 value of up to about 85%.

TABLE 1

| | Degree of Polymerization (DP) Value for Typical Hydrogenated Starch Hydrolysates | | | | | |
|---|---|---|---|---|---|---|
| | DP-1 | DP-2 | DP-3 | DP 4+ | DP-3-DP-6 | DP-6+ | DP-3+ |
| Lycasin* | 6-8 | 50-55 | N.D.*** | N.D. | 20-25 | 15-20 | 35-45 |
| Hystar** HM-75 | 15 | 50 | 12 | 23 | | | 35 |
| Hystar 3375 | 14 | 18 | 10 | 58 | | | 68 |
| Hystar 4075 | 13 | 23 | 12 | 49 | | | 51 |
| Hystar 5875 | 7 | 60 | 11 | 22 | | | 33 |
| Hystar 6075 | 14 | 8 | 10 | 68 | | | 78 |

*Lycasin is a trademark of Roquette Corporation
**Hystar is a trademark of Lonza, Inc.
***Not determined Suitable polymers of glucose include randomly bonded condensation polymers of D-glucose. The polymers of glucose useful herein include those polymers disclosed in U.S. Pat. No. 3,766,165. Preferred polymers of glucose include the randomly bonded condensation polymer of D-glucose manufactured under the trademark POLYDEXTROSE by Pfizer, Inc. and the condensation polymer of dextrose manufactured under the tradename PULLULAN by Hayashibara Biochemical Laboratories Incorporated, Okayama, Japan. Many polymers of glucose have no sweetness and some are low in calories. Accordingly inclusion of these polymers into the present compositions lowers the caloric content of the compositions.

The nonsweet carbohydrate bulking agent is employed in amounts of about 75% to about 25% by weight of the final granule and preferably from about 60% to about 40% by weight. The particle size of the bulking agent is critical in order to obtain the salt substitute which will exhibit both the proper organoleptic properties as well as physical attributes simulating real salt. Particle sizes larger than about 100 mesh, U.S. standard sieve size, have been found acceptable in this invention with preferred sizes between about 35 and 60 mesh. Particle sizes passing through a 100 mesh sieve are too fine to be combined with the salt and form unacceptable products that do not act like real salt. In contrast particles larger than about 35 mesh sieve are too large. It should be recognized that the particular size of the bulking agent should be selected to meet the particular end use application. For example, "pretzel grade" salt may be prepared with bulking agents having particle sizes that pass through a 35 mesh sieve (i.e., plus 35 mesh). "Shaker grade" products may be prepared from bulking agents having from minus 35 to plus 60 mesh materials. "Popcorn grade", size salt substitute may be prepared from bulking agent having minus 60 mesh particle sizes. Since the coated salt substitutes form agglomerates or clusters during manufacture, which may be smaller or larger than desired, it has been found advantageous to size classify such substitutes to obtain more desirable particle size distributions for such uses. Once sorted the final product should have less than about 10% of the granules which are finer than 100 mesh. All mesh sizes are by U.S. standard sieve size. The designation of a minus mesh size refers to material capable of passing through said mesh size screen. Whereas, a plus mesh size refers to material being retained on said mesh size screen.

When the nonsweet bulking agent is prepared from sweet carbohydrates which are treated with a sweetener inhibitor, the inhibitor is employed in amounts of about 0.01% to about 0.5% and preferably 0.05% to about 0.2% by weight of the total weight of the non-sweet component, namely the combined weight of the sweet carbohydrate and inhibitor should equal 100%. For example if 0.14% of the inhibitor were employed with 49.86% bulking agent, the resulting composition represents use of 50% bulking agent in the formulations of this invention.

The sodium chloride is employed in the invention in amounts of about 25% to about 75% by weight of the final formulation, i.e., granule and preferably about 40% to about 60% by weight. The particle size of the salt is critical when it is added in powdered form. Such particle size should be similar to the particle size of the bulking agent to prevent clumping of large salt particles with relatively fine bulking agent particles. Sizes from about minus 35 mesh to plus 60 mesh are preferred with sizes of plus 100 mesh being acceptable.

In the final formulation, the weight ratio of bulking agent to sodium chloride is preferably 3:1 to 1:3.

The free-flowing salt substitute granules may be prepared by forming the non-sweet carbohydrate bulking agent if not already in nonsweet form, grinding or otherwise reducing the particle size to the desired particle size, blending the sodium chloride with the bulking agent to achieve the desired sodium reduction and agglomerating, fusing, spray coating, or otherwise attaching the salt to the bulking agent and recovering the product.

One preferred process involves (a) forming a core particle comprising particulate nonsweet carbohydrate bulking agent having a particle size of plus 100 mesh, U.S. standard sieve size; (b) admixing a powdered sodium chloride therewith to form a coated core; and (c) recovering a freeflowing salt substitute granule.

When preparing the salt granule using powdered salt it is advantageous to employ a granulating agent to aid in retaining the salt agglomerates together. Such granulating agents are well known and include hydrocolloids which impart smoothness and body texture to the product. Granulating agents may be selected from a wide variety of water-soluble hydrocolloid agents. Useful hydrocolloids include natural and modified gums, celluloses and modified celluloses, pectin, mucilages, modified starches, noncellulosic polysaccharides, algal polysaccharides and mixtures thereof. Particularly preferred hydrocolloids include carboxymethyl cellulose, methyl cellulose, karaya gum, acacia gum, sodium alginate, calcium alginate, hydroxypropyl methyl cellulose and mixtures thereof. The hydrocolloids are present in the amount of about 0.25% to about 25%, preferably about 0.5% to about 5.0% by weight. Materials which may not be employed are those that do not simulate salts physical properties and include such unacceptable bulking agents as insoluble phosphates, insoluble silicates, and other metal oxides like titanium dioxide.

Another preferred process involves (a) forming a core particle comprising a particulate nonsweet carbohydrate bulking agent having a particle size of minus 100 mesh, U.S. standard sieve size; (b) spray coating the core particles with an aqueous solution of sodium chloride to coat the core particles; (c) drying the salt coated particles and recovering a free-flowing salt substitute granule.

According to this procedure, the salt is sprayed as an aqueous solution onto an agitated bed of bulking agent. The aqueous solution may contain any suitable concentration of salt and may be employed in any suitable amount relative to the amount of bulking agent being coated. A preferred salt concentration is from about 10% to about 40% salt by weight in water. It should be noted that supersaturated solutions of salt may be advantageously employed to produce the granules of this invention.

The instant compositions may include materials selected from colorants, pigments, decolorants, oils, fats, preservatives, humectants, stickiness reducers, graining compounds, and so forth, and mixtures thereof, in varying amounts.

The colorants useful in the present invention are preferably water-soluble. A preferred pigment, titanium dioxide, may be incorporated in amounts up to about 1% by weight. Also, the colorants may include other dyes suitable for food, drug and cosmetic applications, and known as F.D.&C. dyes and lakes. A full recitation of all F.D.&C. colorants and their corresponding chemical structures may be found in the Kirk-Othmer Encyclopedia of Chemical Technology, 3rd edition, in Volume 6, at pages 561–595, which text is incorporated herein by reference. The pigments and colorants when used are generally present in amounts up to about 1%, by weight of the final composition, and preferably from about 0.01% to about 1%, by weight of the final composition.

Suitable preservatives include butylated hydroxyanisole (BHA), butylated hydroxytoluene (BHT), benzoic acid, ascorbic acid, methylparaben, propylparaben, ethylenediaminetetraacetic acid (EDTA), tocopherols and mixtures present in amounts up to about 1.0% by weight, and preferably from about 0.1% to about 1.0%, by weight of the final composition.

Suitable humectants include glycerin, sorbitol, fructose and mixtures thereof. Humectants when used are generally present in amounts up to about 5% by weight, and preferably from about 1.0% to about 5.0%, by weight of the final composition.

Suitable surface stickiness reducers include mono- and diglycerides, and mixtures thereof. The stickiness reducers when used are present in amounts up to about 1.0% by weight, and preferably from about 0.1% to about 1.0%, by weight of the final composition.

Suitable chloride salts that may be employed to replace a portion of the sodium chloride used herein include potassium chloride, ammonium chloride, and mixtures thereof and so forth. When used such materials are employed in amounts of about 10% to 50% by weight of the sodium chloride content.

The present inventive salt substitutes may be used as a substitute for natural salt in all applications that natural salt are employed. For example, shaker salt or table salt, salt to be used on other edible foods as well as salt of various particle sizes, such as pretzel salt and popcorn grade salt. When the salt is applied to edible food, it is simply applied like natural salt would be. The salt substitute clings or adheres to the food product the same way as natural salt.

The present invention is further illustrated by the following examples which are not intended to limit the effective scope of the claims. All parts and percentages in the examples and throughout the specification and claims are by weight of the final composition unless otherwise specified, based upon 100% total weight.

EXAMPLE 1

Salt Substitute Granules

Part I. Sucrose Desweetening 1000 g sucrose was dissolved in 200 ml $H_2O$ and heated to 150° C. A desweetening agent in the amount of 1.4 g, namely Lactisol (1.4 g) was added and mixed until uniformly dispersed to produce to nonsweet carbohydrate bulking agent. The nonsweet carbohydrate blend was spread on a slab and allowed to cool. Upon cooling to room temperature (about 24° C.) the mixture was ground in a blender and passed through a 45 mesh screen sieve, U.S. standard mesh size. The plus 45 mesh particles were without sweetness and were virtually tasteless and odorless.

Part II. Salt Substitute Granule Preparation:

475 g each of the desweetened sugar particles and superfine popcorn grade salt were combined. This mixture was agglomerated in a Glatt Uniglatt fluidized bed granulator under the following conditions:

1) Granulating Solution: 0.6% aqueous solution of hydroxypropyl methylcellulose
2) Spray Rate: About 25 ml/min intermittent to avoid overwetting
3) Inlet Air Temperature: 60°–70° C.
4) Inlet Air Flap Setting: 45
5) Spray Pressure: 1.5 bar After 300 ml granulating solution was applied the agitated granules, they were dried for 10 min. The granules appeared well formed when viewed under a steromicroscope. The granules untapped bulk density was 0.54 while its particle size distribution was:

| | |
|---|---|
| on 16 mesh | 0.63% |
| through 16 on 20 mesh | 4.74 |
| through 20 on 30 mesh | 31.83 |
| through 30 on 45 mesh | 41.40 |
| through 45 on 60 mesh | 10.95 |
| through 60 mesh | 10.45 |

When tasted, the particles had an organoleptic of natural salt, and exhibited physical properties similar to natural salt. Edible food tested with this substitute were indistinguishable from the same food treated with natural salt.

EXAMPLE II

Salt Substitute Particle Prepared by Coating

Part I: Sucrose Desweetening 1000 g sucrose was dissolved in 200 ml $H_2O$ and heated to 146° C. After cooling to 120° C. a desweetening agent in the amount of 1.4 g, namely Lactisol, was added and mixed until it became uniformly dispersed. The nonsweet carbohydrate blend was spread on a slab and cooled to room temperature (about 24° C.). The mixture was broken into small pieces and ground in a blender. The particles that passed through a 50 mesh screen sieve, U.S. standard mesh size were selected. These fine particles were without sweetness and were virtually tasteless and odorless.

Part II: Salt Substitute Granule Preparation 500 g of the desweetened carbohydrate particles were placed in a Glatt Uniglatt fluidized bed coater/granulator. A 20% NaCl solution was sprayed onto the desweetened particles until a weight ratio of 2:1 desweetened carbohydrate/NaCl was achieved. The conditions used were:

1) Coating Solution: 20% w/w NaCl in deionized water
2) Spray Rate: About 1–5 ml/min intermittent to avoid overwetting
3) Inlet Air Temperature: 90° C.
4) Inlet Air Flap Setting: 35
Spray Pressure: about 2 bar The coated particles appeared opaque when viewed under a steromicroscope. The particles size ranged from 0.5 cm diameter to less than 50 mesh. The taste of the particles was only slightly less salty than pure NaCl.

The invention being thus described, it will be obvious that the same may be varied in many ways. Such variations are not to be regarded as a departure from the spirit and scope of the invention and all such modifications are intended to be included within the scope of the following claims.

We claim:

1. A free-flowing salt substitute granule which comprise:
   a) a core composition comprising a crystalline sugar bulking agent desweetened by a sweetness inhibiting agent selected from the group consisting of 2-p-methoxyphenoxypropionic acid, p-methoxybenzylacetic acid, their salt or acid derivatives and mixtures thereof; and
   b) a coating on the core comprising sodium chloride.

2. The salt substitute granule of claim 1 which contains about 25% to about 75% desweetened crystalline sugar bulking agent and about 75% to about 25% sodium chloride.

3. The salt substitute granule of claim 1 wherein the crystalline sugar bulking agent is selected from the group consisting of sugars, sugar alcohols, hydrogenated hexoses, and hydrogenated pentoses, hdyrogenated disaccharides, sweet hydrogenated starch hydrosylates and mixtures thereof.

4. The salt substitute granule of claim 1 wherein the crystalline sugar bulking agent is selected from the group consisting of sucrose, glucose, xylose, ribose, mannose, galactose, fructose, dextrose, maltose, invert sugar, partially hydrolyzed starch, corn syrup solids and mixtures thereof.

5. The salt substitute granule of claim 1 wherein the crystalline sugar bulking agent is a sugar alcohol selected from the group consisting of sorbitol, xylitol, mannitol, galactitol, maltitol, and mixtures thereof.

6. The salt substitute granule of claim 1 wherein the crystalline sugar bulking agent is selected from a group consisting of hydrogenated hexoses and hydrogenated disaccharides, and mixtures thereof.

7. The salt substitute granule of claim 1 wherein the crystalline sugar bulking agent is a hydrogenated starch hydroxylate having a DP-1 value present in amounts from about 5% to about 10%, a DP2 value present in amounts from about 15% to about 65%, and a DP-3 and DP-4 value present in amounts from about 30% to about 70%.

8. The salt substitute granule of claim 1 wherein the granule additionally contains a material selected from the group consisting of colorants, pigments, decolorants, oils, fats, preservatives, humectants, stickiness reducers, graining compounds and mixtures thereof.

9. The salt substitute granule of claim 1 wherein the crystalline sugar bulking agent is present in amounts of about 60 to about 40% by weight and the sodium chloride is present in amounts of about 40% to about 60% by weight, all weights being of the final granule weight.

10. The salt substitute granule of claim 9 wherein the sweetness inhibiting agent is present in amounts of about 0.01% to about 0.5% by weight of the total weight of the core composition.

11. The salt substitute granule of claim 10 wherein the inhibitor is present in amounts of about 0.05% to about 0.2% by weight of the total weight of the core composition.

12. A method of salting an edible food product which comprises adding to the edible food product a salt substitute granule as defined in claim 1.

13. An edible food product which comprises an edible food and sprinkled thereon or adhered thereto the salt substitute granule as defined in claim 1.

14. A table salt substitute product comprising the free-flowing salt substitute granule as defined in claim 1.

15. A method for preparing a free-flowing salt substitute granule which comprises:
   a) forming a core particle comprising a particulate crystalline sugar bulking agent having a particle size of less than about 60 mesh, U.S. standard sieve size that has been desweetened by a sweetness inhibiting agent selected from the group consisting of 2-p-methoxyphenoxypropronic acid, p-methoxybenzylacetic acid, their salt or acid derivatives and mixtures thereof;
   b) admixing powdered sodium chloride therewith to form a coated core, and;
   c) recovering a free flowing sodium chloride salt granule.

16. The method of preparing the salt substitute granule of claim 13 wherein the crystalline sugar bulking agent is selected from the group consisting of sugars, sugar alcohols, hydrogenated hexoses, hydrogenated disaccharides, sweet hydrogenated starch hydrosylates and mixtures thereof.

17. The method of preparing the salt substitute granule of claim 13 wherein the powdered sodium chloride is mixed with the bulking agent in the presence of a granulating agent.

18. The method of claim 17 wherein the granulating agent is selected from the group consisting of natural and modified gums, celluloses, pectin, mucilages, modified starches, noncellulosic polysaccharides, algal polysaccharides and mixtures thereof.

19. The method of claim 13 wherein less than about 10% of the granules are finer than 100 mesh, US standard sieve size.

20. The method of claim 13 wherein the weight ratio of the crystalline sugar bulking agent to sodium chloride is from about 3:1 to 1:3.

21. A method for preparing a free-flowing salt substitute granule which comprises:
   a) forming a core particle compound of a crystalline sugar bulking agent having a particle size of at least about 100 mesh, U.S. standard sieve size that has been desweetened by a sweetness inhibiting agent selected from the group consisting of 2-p-methoxyphenoxypropionic acid, p-methoxybenzylacetic acid, their salt or acid derivatives and mixtures thereof;
   b) spray coating the core particle with an aqueous solution of sodium-chloride to coat the core particles; and
   c) drying the salt coated particles and recovering the free flowing salt granules.

22. The method of preparing the salt substitute granule of claim 21 wherein the crystalline sugar bulking agent is selected from the group consisting of sugars, sugar alcohols, hydrogenated hexoses, hydrogenated disaccharides, sweet hydrogenated starch hydrosylates and mixtures thereof.

23. The method of claim 21 wherein the aqueous solution contains about 10% to about 40% sodium chloride.

24. The method of claim 21 wherein less than about 10% of the granules are finer than about 100 mesh, U.S. standard sieve size.

25. The method of claim 21 wherein the weight ratio of carbohydrate to sodium chloride is from about 3:1 to 1:3 percent by weight.

* * * * *